United States Patent
Wunderlich-Wippert et al.

(10) Patent No.: US 7,291,682 B2
(45) Date of Patent: Nov. 6, 2007

(54) METHOD OF PRODUCING COMB OR STAR COPOLYMERS USING EPOXY-FUNCTIONALIZED NITROXYLETHERS

(75) Inventors: Wiebke Wunderlich-Wippert, Lörrach (DE); Rudolf Pfaendner, Rimbach (DE); Francesco Fuso, Therwil (CH); Jochen Fink, Nussloch (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 316 days.

(21) Appl. No.: 10/524,926

(22) PCT Filed: Aug. 26, 2003

(86) PCT No.: PCT/EP03/09410

§ 371 (c)(1),
(2), (4) Date: Feb. 17, 2005

(87) PCT Pub. No.: WO2004/022617

PCT Pub. Date: Mar. 18, 2004

(65) Prior Publication Data

US 2006/0020105 A1 Jan. 26, 2006

(30) Foreign Application Priority Data

Sep. 4, 2002 (EP) .................. 02405763

(51) Int. Cl.
C08F 283/06 (2006.01)
C08G 65/22 (2006.01)
(52) U.S. Cl. .............. 525/404; 528/393; 528/420
(58) Field of Classification Search ............ None
See application file for complete search history.

(56) References Cited

U.S. PATENT DOCUMENTS 3,418,354 A * 12/1968 Wheeler, Jr. ............ 556/444
3,546,321 A * 12/1970 Jabloner et al. ............ 525/400
3,833,522 A * 9/1974 Tucker ...................... 528/419

FOREIGN PATENT DOCUMENTS

| WO | 99/46261 | 9/1999 |
|---|---|---|
| WO | 00/14135 | 3/2000 |
| WO | 02/48109 | 6/2002 |

OTHER PUBLICATIONS

S. Kobatake et al., Macromolecules, (1997), vol. 30, pp. 4238-4242.

* cited by examiner

*Primary Examiner*—David J. Buttner
(74) *Attorney, Agent, or Firm*—Tyler A. Stevenson

(57) ABSTRACT

The present invention provides a method of forming comb or star copolymers. The comb or star copolymers are useful in surface modification of thermoplastic materials or as surfactants. The method is aimed at attaching a polymeric side chain differing in polarity and chemical structure from the backbone and forming a comb or star copolymer structure. In particular the process comprises polymerizing in a first step a polymer backbone from epoxy and nitroxylether group containing monomers and in a second step polymerizing under controlled radical conditions a comb or star structure onto this backbone. The epoxy group containing monomers are for example of the formula (II)

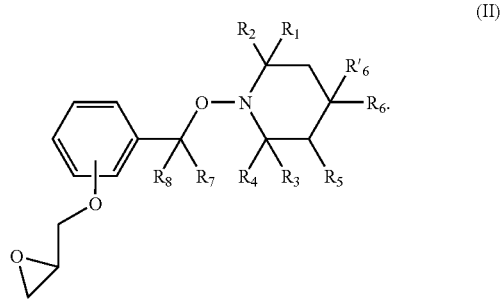

(II)

10 Claims, No Drawings

METHOD OF PRODUCING COMB OR STAR COPOLYMERS USING EPOXY-FUNCTIONALIZED NITROXYLETHERS

This application is a 371 of PCT/EP03/09410 filed Aug. 26, 2003.

The synthesis of amphiphilic block- and graft copolymers containing both unpolar and polar chain species of different chemical nature has been approached by several techniques. A promising approach for the synthesis of aliphatic polyether backbones has been described, for example, by Heitz et al. in Macromol. Chem. 183, 1685 (1982).

One problem, especially in the design of graft copolymers, is the lack of grafting efficiency, especially if a radical "grafting to" process is chosen. Complete grafting of the graft monomer is seldom achieved and hence the final product is always contaminated with homopolymer formed in the grafting step. This process is mostly applied in the synthesis of high impact polystyrene, where styrene is grafted radically onto a polybutadiene latex. More efficient grafting is achieved when active sites within the polymeric backbone are used to covalently attach new polymer chains to the starting molecule. This requires, however, the presence of well-defined "initiation points" in the backbone.

Linear polyethers based on ethylene oxide and/or propylene oxide, besides their vast application in polyurethanes, find numerous applications in pharmaceutical and biomedical applications. Industrial applications include amongst numerous others flocculating agents in the treatment of industrial waste water, drag reduction and the modification of surface properties, such as the use as antistatic agents. Linear block copolymers of ethylene and propylene oxide also have commercial applications and serve as non-ionic tensides, emulsifiers and stability improvers (as for example "Pluronics®" manufactured by BASF). Also statistical copolymers of this type are accessible. Most of these products are liquids or waxes, depending on their final molecular weight. These copolymers are still water soluble with a minimum content of 25% ethylene oxide and hence pose an interesting class of materials for the synthesis of amphiphilic graft copolymers.

Besides ethylene oxide, propylene oxide and monomers derived therefrom, epichlorohydrine forms polyethers, which are used as specialty rubbers.

The present invention provides a method of attaching a polymeric side chain to a polymer backbone differing in polarity and chemical structure therefrom and forming a comb or star polymer structure. This represents a new method in the synthesis of comb or star copolymers combining two separate polymerization processes. The properties of polyethers can now be combined with those of typical thermoplastic polymers. In addition a new class of initiators for the synthesis of star polymers is provided.

In particular the process provides a method of polymerizing in a first step a polymer back bone from epoxy group containing monomers and in a second step polymerizing under controlled radical conditions a comb or star structure onto this back bone.

The described process allows alternatively the access to comb or star polymers. Star copolymers are achieved for example if the polymer chain consists of a short chain length for example 3 to 5 units. Comb copolymers are mainly obtained at prolonged chain lengths or if random copolymers are synthesized. The number of grafts can then be adjusted by the concentration of comonomers.

The resulting copolymer structures are of interest in surface modification applications of thermoplastic materials, insuring a permanent polar surface by anchoring the polar moiety via the less polar polymer chains in the matrix of the desired resin. Similarly, these polymers can be used as nonionic surfactants. The incorporation of the novel molecules into a backbone polymer containing epichlorohydrine can lead to rubber-thermoplastic comb copolymers.

One aspect of the invention is a method for the preparation of a comb or star copolymer comprising
a) polymerising in a first step one or more epoxy group containing monomers to obtain a polyether, wherein at least one monomer is of formula (I)

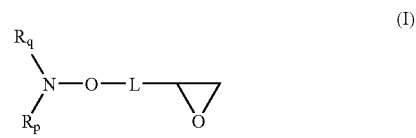

wherein L is a linking group selected from the group consisting of $C_1$-$C_{18}$alkylene, phenylene, phenylene-$C_1$-$C_{18}$alkylene, $C_1$-$C_{18}$alkylene-phenylene, $C_1$-$C_{18}$alkylene-phenyleneoxy and $C_5$-$C_{12}$cycloalkylene;

$R_p$ and $R_q$ are independently tertiary bound $C_4$-$C_{28}$alkyl groups which are unsubstituted or substituted by one or more electron withdrawing groups or by phenyl; or $R_p$ and $R_q$ together form a 5 or 6 membered heterocyclic ring which is substituted at least by 4 $C_1$-$C_4$alkyl groups and which may be interrupted by a further nitrogen or oxygen atom; and in a second step b) adding to the polymer obtained in step a) at least one ethylenically unsaturated monomer, heating the resulting mixture to a temperature where cleavage of the nitroxylether bond occurs and radical polymerization starts;

and polymerizing to the desired degree.

For example the monomer according to formula I is of formula (II)

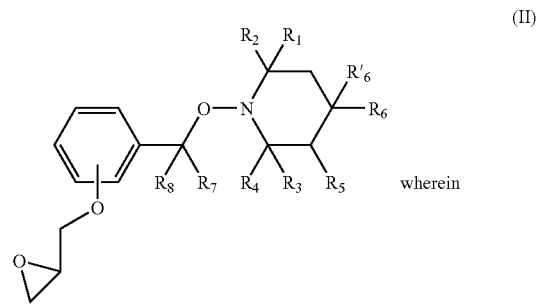

wherein $R_1$, $R_2$, $R_3$ and $R_4$ are independently of each other $C_1$-$C_4$alkyl;

$R_5$ is hydrogen or $C_1$-$C_4$alkyl;

$R'_6$ is hydrogen and $R_6$ is H, $OR_{10}$, $NR_{10}R_{11}$, —O—C(O)—$R_{10}$ or $NR_{11}$—C(O)—$R_{10}$;

$R_{10}$ and $R_{11}$ independently are hydrogen, $C_1$-$C_{18}$alkyl, $C_2$-$C_{18}$alkenyl, $C_2$-$C_{18}$alkinyl or $C_2$-$C_{18}$alkyl which is substituted by at least one hydroxy group or, if $R_6$ is $NR_{10}R_{11}$, taken together, form a $C_2$-$C_{12}$alkylene bridge or a $C_2$-$C_{12}$-alkylene bridge interrupted by at least one O atom; or $R_6$ and $R'_6$ together are both hydrogen, a group =O or =N—O—$R_{20}$ wherein $R_{20}$ is H, straight or branched $C_1$-$C_{18}$alkyl, $C_3$-$C_{18}$alkenyl or $C_3$-$C_{18}$alkinyl, which may be unsubstituted or substituted, by one or more OH, $C_1$-$C_8$alkoxy, carboxy, $C_1$-$C_8$alkoxycarbonyl;

$C_5$-$C_{12}$cycloalkyl or $C_5$-$C_{12}$cycloalkenyl;

phenyl, $C_7$-$C_8$phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl; —C(O)—$C_1$-$C_{36}$alkyl, or an acyl moiety of a α,β-unsaturated carboxylic acid having 3 to 5 carbon atoms or of an aromatic carboxylic acid having 7 to 15 carbon atoms; —$SO_3^-Q^+$, —$PO(O^-Q^+)_2$, —$P(O)(OR_2)_2$, —$SO_2$—$R_2$, —CO—NH—$R_2$, —$CONH_2$, $COOR_2$, or $Si(Me)_3$, wherein $Q^+$ is $H^+$, ammnonium or an alkali metal cation; or $R_6$ and $R_6'$ are independently —O—$C_1$-$C_{12}$alkyl, —O—$C_3$-$C_{12}$alkenyl, —O—$C_3$-$C_{12}$alkinyl, —O—$C_5$-$C_8$cycloalkyl, —O-phenyl, —O-naphthyl, —O—$C_7$-$C_9$phenylalkyl; or $R_6$ and $R'_6$ together form one of the bivalent groups —O—C($R_{21}$)($R_{22}$)—CH($R_{23}$)—O—, —O—CH($R_{21}$)—$CH_{22}$—C($R_{22}$)($R_{23}$)—O—, —O—CH($R_{22}$)—$CH_2$—C($R_{21}$)($R_{23}$)—O—, —O—$CH_2$—C($R_{21}$)($R_{22}$)—CH($R_{23}$)—O—, —O-o-phenylene-O—, —O-1,2-cyclohexyliden-O—, —O—$CH_2$—CH=CH—$CH_2$—O— or

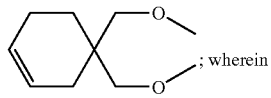; wherein $R_{21}$ is hydrogen, $C_1$-$C_{12}$alkyl, COOH, —COO—($C_1$-$C_{12}$)alkyl or $CH_2OR_{24}$;

$R_{22}$ and $R_{23}$ are independently hydrogen, methyl ethyl, COOH or COO—($C_1$-$C_{12}$)alkyl;

$R_{24}$ is hydrogen, $C_1$-$C_{12}$alkyl, benzyl, or a monovalent acyl residue derived from an aliphatic, cycloaliphatic or aromatic monocarboxylic acid having up to 18 carbon atoms; and $R_7$ and $R_8$ are independently hydrogen or $C_1$-$C_{18}$alkyl.

$C_1$-$C_{18}$alkyl can be linear or branched. Examples are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl or octadecyl. Where up to $C_{36}$alkyl is possible, $C_1$-$C_{18}$alkyl is preferred.

Alkyl substituted by a group —COOH is for example $CH_2$—COOH, $CH_2$—$CH_2$—COOH, $(CH_2)_3$—COOH or $CH_2$—CHCOOH—$CH_2$—$CH_3$ Hydroxyl- or alkoxycarbonyl substituted $C_1$-$C_{18}$alkyl can be, for example, 2-hydroxyethyl, 2-hydroxypropyl, methoxycarbonylmethyl or 2-ethoxycarbonylethyl.

Alkenyl having from 2 to 18 carbon atoms is a branched or unbranched radical, for example propenyl, 2-butenyl, 3-butenyl, isobutenyl, n-2,4-pentadienyl, 3-methyl-2-butenyl, n-2-octenyl, n-2-dodecenyl, isododecinyl.

Alkinyl having from 2 to 18 carbon atoms is a branched or unbranched radical, for example propinyl, 2-butinyl, 3-butinyl, isobutinyl, n-2,4-pentadiinyl, 3-methyl-2-butinyl, n-2-octinyl, n-2-dodecinyl, isododecinyl.

Examples of alkoxy are methoxy, ethoxy, propoxy, isopropoxy, butoxy, isobutoxy, pentoxy, isopentoxy, hexoxy, heptoxy or octoxy.

$C_7$-$C_9$phenylalkyl, is for example benzyl, α-methylbenzyl, α,α-dimethylbenzyl or 2-phenylethyl, benzyl is preferred.

$C_5$-$C_{12}$cycloalkyl is for example cyclopentyl, cyclohexyl, cycloheptyl, methylcyclopentyl or cyclooctyl.

$C_5$-$C_{12}$cycloalkenyl is for example 3-cyclopentenyl, 3-cyclohexenyl or 3-cycloheptenyl.

Examples of a monocarboxylic acid having up to 18 carbon atoms are formic acid, acetic acid, propionic acid, the isomers of valeric acid, methyl ethyl acetic acid, trimethyl acetic acid, capronic acid, lauric acid or stearic acid. Examples for unsaturated aliphatic acids are acrylic acid, methacrylic acid, crotonic acid, linolic acid and oleic acid.

Typical examples of cycloaliphatic carboxylic acids are cyclohexane carboxylic acid or cyclopentane carboxylic acid.

Examples of aromatic carboxylic acids are benzoic acid, salicylic acid or cinnamic acid.

Halogen is F, Cl, Br or I.

$C_1$-$C_{18}$alkylene is a branched or unbranched radical, for example methylene, ethylene, propylene, trimethylene, tetramethylene, pentamethylene, hexamethylene, heptamethylene, octamethylene, decamethylene or dodecamethylene.

$C_2$-$C_{12}$alkylene bridges interrupted by at least one O atom are, for example, —$CH_2$—O—$CH_2$—$CH_2$—, —$CH_2$—O—$CH_2$—$CH_2$—$CH_2$—, —$CH_2$—O—$CH_2$—$CH_2$—$CH_2$—$CH_2$—, —$CH_2$—O—$CH_2$—$CH_2$—O—$CH_2$—.

Alkoxycarbonyl is for example methoxycarbonyl, ethoxycarbonyl, propoxycarbonyl.

Preferably $R_1$, $R_2$, $R_3$, $R_4$ are methyl, or $R_1$ and $R_3$ are ethyl and $R_2$ and $R_4$ are methyl, or $R_1$ and $R_2$ are ethyl and $R_3$ and $R_4$ are methyl.

For instance $R_5$ is hydrogen or methyl.

In particular $R'_6$ is hydrogen and $R_6$ is H, $OR_{10}$, $NR_{10}R_{11}$, —O—C(O)—$R_{10}$ or $NR_{11}$—C(O)—$R_{10}$;

$R_{10}$ and $R_{11}$ independently are hydrogen, $C_1$-$C_{18}$alkyl, $C_2$-$C_{18}$alkenyl, $C_2$-$C_{18}$alkinyl or $C_2$-$C_{18}$alkyl which is substituted by at least one hydroxy group or, if $R_6$ is $NR_{10}R_{11}$, taken together, form a $C_2$-$C_{12}$alkylene bridge or a $C_2$-$C_{12}$-alkylene bridge interrupted by at least one O atom; or $R_6$ and $R'_6$ together are both hydrogen, a group =O or =N—O—$R_{20}$ wherein $R_{20}$ is H or straight or branched $C_1$-$C_{18}$alkyl.

In another preferred embodiment of the invention $R_6$ and $R'_6$ together form one of the bivalent groups —O—C($R_{21}$)($R_{22}$)—CH($R_{23}$)—O—, —O—CH($R_{21}$)—$CH_{22}$—C($R_{22}$)($R_{23}$)—O—, —O—CH($R_{22}$)—$CH_2$C($R_{21}$)($R_{23}$)—O—, —O—$CH_2$—C($R_{21}$)($R_{22}$)—CH($R_{23}$)—O— and $R_{21}$, $R_{22}$ and $R_{23}$ have the meaning as defined above.

Specific compounds are given in Table A

TABLE A

| Compound Number | Structure |
|---|---|
| 101 | ![structure 101] |
| 102 | ![structure 102] |
| 103 | ![structure 103] |
| 104 | ![structure 104] |
| 105 | ![structure 105] |

The compounds of formula II and in particular the compounds given in Table A are known and may be prepared as described in WO 99/46261, WO 02/48109 or U.S. Pat. No. 5,721,320.

Examples of suitable other epoxy functional monomers

which can be used as comonomers are given in Table B.

TABLE B

| Name | CAS No. | X |
|---|---|---|
| Ethylene oxide | 75-21-8 | H |
| Propylene oxide | 75-56-9 | $CH_3$ |
| 2,3-Epoxypropyl-phenylether | 122-60-1 | $CH_2-O-C_6H_5$ |
| 2,3-Epoxypropyl-4-nonyl-phenylether | 6178-32-1 | $CH_2-O-C_6H_5-C_9H_{19}$ |
| Epichlorohydrine | 106-89-8 | $-CH_2-Cl$ |
| 2,3-Epoxypropyl-2,2,3,3,4,4,5,5-octafluoropentylether | 19932-27-5 | $CH_2-O-CH_2-(CF_2)_3CHF_2$ |

For instance the epoxy group containing a monomer different from that of formula I is selected from the group consisting of ethylene oxide, propylene oxide, 2,3-epoxypropyl-phenylether, 2,3-epoxypropyl-4-nonyl-phenylether, epichlorohydrine and 2,3-epoxypropyl-2,2,3,3,4,4,5,5-octafluoropentylether.

These compounds are known and commercially available.

Preferably the weight ratio of the monomers of formula I or formula II to the sum of other monomers is from 99:1 to 1:99, particularly 80:20 to 20:80, specifically 75:25 to 25:75.

The general polymerization procedure of step a) is well known and for example described in Encyclopedia of Polymer Science and Technology, Vol 6, 1967, 103-209. There are principally two different processes. The first depends upon the tendency of the oxiran group to oxyalkylated active-hydrogen sites in the presence of Lewis acids or Lewis bases as catalysts. The second type of polymerization reaction involves the rapid polymerization of the oxiran group to high molecular weight polymers on a catalytic surface in a heterogeneous reaction system. Other initiation systems are described in Odian, "Principles of polymerization", Wiley-Interscience New York, 1991, pp. 536 and Houben Weyl, Makromolekulare Stoffe, Bd. E20/2, Thieme Stuttgart, 1987, pp 1367. They include furthermore aluminium porphyrin coumpounds and certain iron and zinc complexes as catalysts.

The polymerization can be carried out in bulk or in solution, containing 10-90% (by vol.) solvent, the latter especially if gaseous monomers (propylene oxide or ethylene oxide) are used. Suitable solvents include tetrahydrofurane (THF), benzene, toluene, acetonitrile, dimethylformamide (DMF), chlorinated solvents and mixtures thereof. If the backbone contains a high fraction of ethylene oxide, also water or mixtures of water with suitable organic solvents can be used.

Suitable Lewis bases are for example alkali metal alcoholates.

The polyether polymer of step a) has for example an average weight molecular weight of $M_w$ 1000 to 100 000, preferably from 2000 to 50 000.

The reaction temperature should be kept preferably as low as possible since cleavage of the nitroxylether bond depends on he chemical structure and may occur at temperatures above 100° C. The polymerization temperature should therefore not exceed 100° C. A suitable polymerization temperature is for example from 10° to 80° C., preferably from 30° to 70° C. Polymerization is normally carried out under inert gas atmosphere at normal atmospheric pressure.

Since lower reaction temperatures are applied reaction time is usually longer, typically from 1-72 hours, in particular 1-48 hours, preferably 2-24 hours.

The isolation of the polyether backbone polymer depends on its molecular structure. Residual monomer can be removed in vacuo at temperatures not exceeding 100° C. if they are liquid, extracted (for example via Soxleth extraction) or washed with appropriate solvents if they are solid.

Preferably the ethylenically unsaturated monomer or oligomer added in step b) is selected from the group consisting of styrene, substituted styrene, conjugated dienes, vinyl acetate, vinylpyrrolidone, vinylimidazole, maleic anhydride, (alkyl)acrylic acidanhydrides, (alkyl)acrylic acid salts, (alkyl)acrylic esters, (meth)acrylonitriles, (alkyl)acrylamides, vinyl halides or vinylidene halides.

Particularly the ethylenically unsaturated monomers are isoprene, 1,3-butadiene, $\alpha$-$C_5$-$C_{18}$alkene, styrene, $\alpha$-methyl styrene, p-methyl styrene or a compound of formula $CH_2=C(R_a)-(C=Z)-R_b$, wherein $R_a$ is hydrogen or $C_1$-$C_4$alkyl, $R_b$ is $NH_2$, $O^-(Me^+)$, glycidyl, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, hydroxy-substituted $C_1$-$C_{18}$alkylamino or hydroxy-substituted di($C_1$-$C_{18}$alkyl)amino, $-O-CH_2-CH_2-N(CH_3)_2$ or $-O-CH_2-CH_2-N^+H(CH_3)_2An^-$;

$An^-$ is a anion of a monovalent organic or inorganic acid;
Me is a monovalent metal atom or the ammonium ion.
Z is oxygen or sulfur.

Examples for $R_a$ as $C_2$-$C_{100}$alkoxy interrupted by at least one O atom are of formula

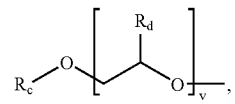

wherein $R_c$ is $C_1$-$C_{25}$alkyl, phenyl or phenyl substituted by $C_1$-$C_{18}$alkyl, $R_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

Further examples of suitable acrylate or methacrylate monomers are given below.

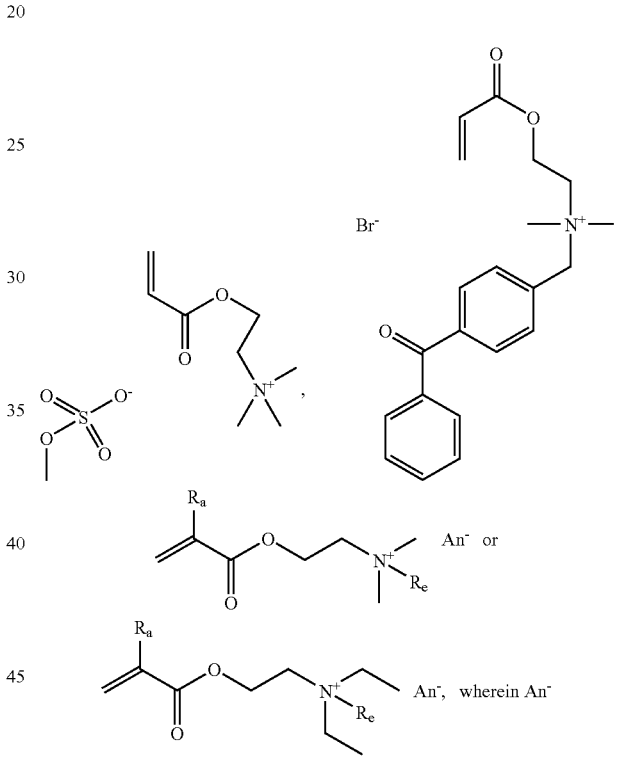

$R_a$ have the meaning as defined above and $R_e$ is methyl, benzyl or benzoylbenzyl. $An^-$ is preferably $Cl^-$, $Br^-$ or $^-O_3S-O-CH_3$.

Further acrylate monomers are

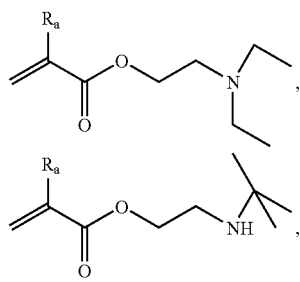

-continued

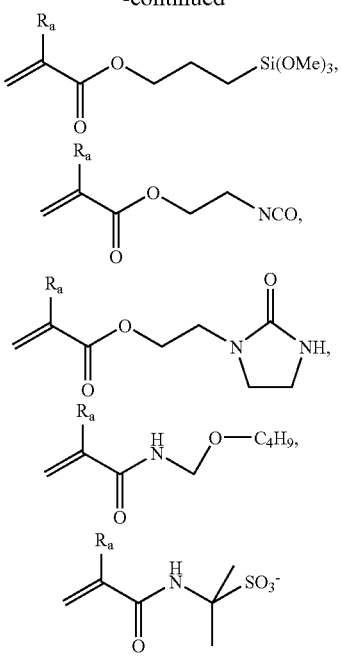

Me⁺, Me⁺ is an alkali metal cation or the ammonium cation.

Examples for suitable monomers other than acrylates are

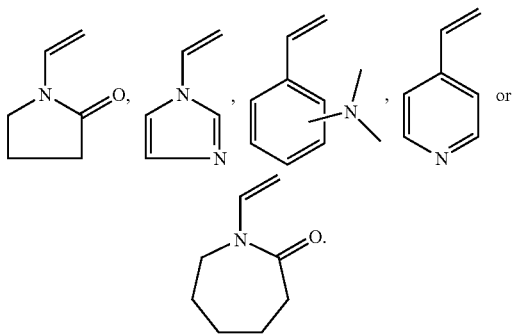

Preferably $R_a$ is hydrogen or methyl, $R_b$ is $NH_2$, gycidyl, unsubstituted or with hydroxy substituted $C_1$-$C_4$alkoxy, unsubstituted $C_1$-$C_4$alkylamino, di($C_1$-$C_4$alkyl)amino, hydroxy-substituted $C_1$-$C_4$alkylamino or hydroxy-substituted di($C_1$-$C_4$alkyl)amino; and Z is oxygen.

Particularly preferred ethylenically unsaturated monomers are styrene, methylacrylate, ethylacrylate, butylacrylate, isobutylacrylate, tert. butylacrylate, hydroxyethylacrylate, hydroxypropylacrylate, dimethylaminoethylacrylate, methyl(meth)acrylate, ethyl(meth)acrylate, butyl(meth)acrylate, hydroxyethyl(meth)acrylate, hydroxypropyl(meth)acrylate, dimethylaminoethyl(meth)acrylate, acrylonitrile, acrylamide, methacrylamide or dimethylaminopropyl-methacrylamide.

For example the weight ratio between the polyether prepared in step a) and the ethylenically unsaturated monomer added in step b) is from 90:10 to 10:90.

As already mentioned the nitroxylether bond cleaves at elevated temperature and radical polymerization is initiated.

Preferably in step b) the polymerization temperature is from 80° C. to 160° C., in particular from 100° C. to 140° C.

Typically the average weight molecular weight $M_w$ is from 2000 to 300 000, preferably from 3000 bis 100000.

The polydispersity index of the resulting comb or star copolymer is typically between 1.1 and 3.0.

A further aspect of the invention is a composition comprising a compound of formula II as defined above, at least one epoxy functional monomer different from that of formula II and optional water or an organic solvent or mixtures thereof.

Yet another aspect of the invention is a polyether obtainable according to step a) of the method described above.

This polyether has an idealized repetitive strucural element of formula Ia or Ib

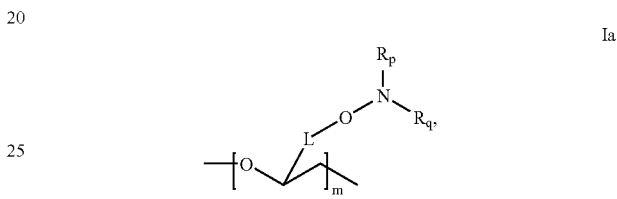

wherein $R_p$, $R_q$, X and L are as defined above and n and m are independently a number from 10 to 1000.

In particular the polyether has an idealized repetitive strucural element of formula IIIa or IIIb

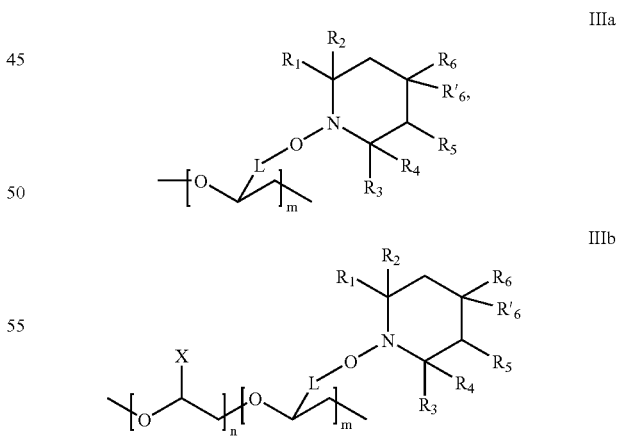

wherein $R_1$, $R_2$, $R_3$, $R_4$, $R_5$, $R_6$, $R'_6$ and L are as defined above, m and n are independently a number from 10 to 1000 and X is H, $CH_3$, $CH_2$—O—$C_6H_5$, $CH_2$—O—$C_6H_5$—$C_9H_{19}$, $CH_2CH_2Cl$ or $CH_2$—O—$CH_2$—$(CF_2)_3CHF_2$.

Most preferably L is a bivalent linking group of formula

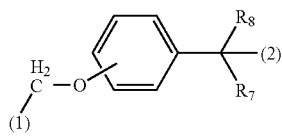

wherein (1) denotes the bond to the polymer backbone and (2) denotes the bond to the oxygen atom of the nitroxyl radical; $R_7$ and $R_8$ are as defined above.

Further subjects of the invention are a comb or star copolymer obtainable according to the method as described above and the use of a polyether with pending nitroxyl ether groups for the preparation of a comb or star copolymer.

For instance the ethylenically unsaturated monomer forming the comb or star is selected from the group consisting of styrene, substituted styrene, (alkyl)acrylic acidanhydrides, (alkyl)acrylic acid salts, (alkyl)acrylic esters, (meth)acrylonitriles and (alkyl)acrylamides.

Definitions for the individual substituents have already been given for the method of preparation of comb or star copolymers, they apply also to the other aspects of the invention.

The polymers prepared by the present invention are useful for following applications: forming parts, extrusion or injection moldings, plastic materials for shaping parts with for example improved processibility and/or barrier properties, adhesives, detergents, dispersants, emulsifiers, surfactants, defoamers, adhesion promoters, corrosion inhibitors, viscosity improvers, lubricants, rheology modifiers, thickeners, crosslinkers, paper treatment, water treatment, electronic materials, paints, coatings, photography, ink iate als, imaging materials, superabsorbants, cosmetics, hair products, preservatives, biocide materials or modifiers for asphalt, leather, textiles, ceramics and wood.

Because the polymerizaton of step b) is a "quasi living" polymerization, it can be started and stopped practically at will. Furthermore, the polymer product retains the functional alkoxyamine group allowing a continuation of the polymerization in a living matter. Thus, in one embodiment of this invention, once the first monomer is consumed in the initial radical polymerizing step a second monomer can then be added to form a second block on the growing polymer chain in a second polymerization step. Therefore it is possible to carry out additional polymerizations with the same or different monomer(s) to prepare multi-block copolymers.

Furthermore, since this is a "quasi living" radical polymerization, blocks can be prepared in essentially any order. One is not necessarily restricted to preparing block copolymers where the sequential polymerizing steps must flow from the least stabilized polymer intermediate to the most stabilized polymer intermediate, such as is the case in ionic polymerization. Thus it is possible to prepare a multi-block copolymer in which a polyacrylonitrile or a poly(meth) acrylate block is prepared first, then a styrene or butadiene block is attached thereto, and so on.

Random copolymers and tapered copolymer structures can be synthesized as well by using a mixture of monomers or adding a second monomer before the first one is completely consumed.

Yet another aspect of the invention is the use of a comb or star copolymer obtainable according to the method described above as adhesive, surface modifier, surfactant or compatibilizer in thermoplastic, elastic or thermosetting polymers or as plastic material for extrusion or injection molding for shaping parts.

The following examples illustrate the invention.

EXAMPLES (V1 AND V2) PROVE THE POLYMERIZABILITY OF THE EPOXY GROUP

Compound A is the precursor molecule in the synthesis for the epoxy-group containing nitroxyl ethers.

Compound A is known and prepared according to standard methods.

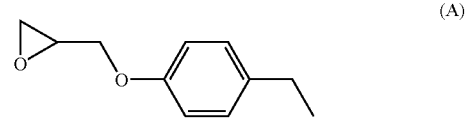

(A)

In order to test its principal ability of polymerizing under Lewis base catalysis compound A is subjected to an anionic polymerization using potassium-tert.-butylate.

In a dry, Argon-purged Schlenk tube equipped with a rubber septum, a magnetic stir bar and an Argon inlet, 3.56 g (0.02 mol) compound A (liquid) are dissolved in 5 ml dry toluene (Merck). 210 mg (1.82 mmol) potassium-tert.-butylate are added and the homogeneous solution is heated for 6 hours at 110° C. After cooling to room temperature, 2 ml of methanol are added via syringe and subsequently the solvents are removed in vacuo. The product is obtained as a colorless wax (V1).

NMR analysis confirms the formation of a polyether due to the presence of the characteristic signals-O—$CH_2$—CH—. Furthermore the absence of monomer is confirmed.

Molecular weights are determined by GPC in tetrahydrofurane (THF) on a HP 1090 device equipped with an RI and UV detector, using a solvent flow of 1 ml/min. Columns are calibrated using polystyrene standards.

The same experiment is successfully repeated with 1 mmol potassium-tert.-butylate as Initiator (V2). Table 1 lists polymer yields and molecular weight data. The "living nature" of this type of polymerization is confirmed by the different molecular weights obtained when using different amounts of initiator.

TABLE 1

| Example | Conversion Compound A (%) | $M_n$ (calc.) | $M_n$ (GPC) | $M_w$ | $M_w/M_n$ |
|---|---|---|---|---|---|
| V1 | 92 | 1840 | 2500 | 3900 | 1.58 |
| V2 | 82 | 3280 | 3500 | 6600 | 1.88 |

EXAMPLE E1-E14

Preparation of the Polyether Backbone Polymer with Pending Nitroxyl Ether Groups

EXAMPLE E1

In a dry, Argon-purged Schlenk tube equipped with a rubber septum, a magnetic stir bar and an Argon inlet, 40 g (0.1 mol) compound 101 (light brown oil), 30 g (0.18 mol) compound A and 4 g (0.036 mol) potassium-tert.-butylate are dissolved in 100 ml dry toluene. The light yellow solution is heated at 60° C. for 18 hours. After the addition of 2 ml methanol solvents are removed in vacuo and the product is dried overnight in vacuo at room temperature. The product is obtained as a highly viscous brown oil.

EXAMPLE E2

In a dry, Argon-purged Schienk tube equipped with a rubber septum, a magnetic stir bar and an Argon inlet, 20 g (0.05 mol) compound 101 (light brown oil), 30 g (0.18 mol) compound A and 4 g (0.036 mol) potassium-tert.-butylate are dissolved in 100 ml dry toluene. The light yellow solution is heated at 60° C. for 18 hours). After the addition of 1 ml methanol solvents are removed in vacuo and the product dried overnight in vacuo at room temperature. The product is obtained as a viscous yellow oil.

EXAMPLE E3

In a dry, Argon-purged Schlenk tube equipped with a rubber septum, a magnetic stir bar and an Argon inlet, 3.35 g (0.01 mol) compound 102 (colorless oil), 7.12 g (0.04 mol) compound A and 0.41 g (0.0036 mol) potassium-tert.-butylate are dissolved in 10 ml dry toluene. The solution is heated at 80° C. for 6 hours. After the addition of 1 ml methanol, solvents are removed in vacuo and the product dried overnight in vacuo at room temperature. The product is obtained as very viscous yellow oil.

EXAMPLE E4

In a dry, Argon-purged Schlenk tube equipped with a rubber septum, a magnetic stir bar and an Argon inlet, 3.35 g (0.01 mol) compound 102 (colorless oil), 3.56 g (0.02 mol) compound A and 0.41 g (0.0036 mol) potassium-tert.-butylate are dissolved in 10 ml dry toluene. The solution is heated at 80° C. for 6 hours. After the addition of 1 ml methanol, solvents are removed in vacuo and the product dried overnight in vacuo at room temperature. The product is obtained as light yellow oil.

EXAMPLE E5

In a dry, Argon-purged Schlenk tube equipped with a rubber septum, a magnetic stir bar and an Argon inlet, 17 g (0.051 mol) compound 102 (colorless oil), 14 g (0.051 mol) 2,3-epoxypropyl-4-nonylphenylether (techn., Sigma-Aldrich, CAS #6178-32-1) ad 1 g (0.009 mol) potassium-tert.-butylate are dissolved in 60 ml dry toluene. The solution is heated at 60° C. for 6 hours. After the addition of 1 ml methanol, solvents are removed in vacuo and the product dried overnight in vacuo at room temperature. The product is obtained as a light brown oil.

EXAMPLE E6

In a dry, Argon-purged Schlenk tube equipped with a rubber septum, a magnetic stir bar and an Argon inlet, 17 g (0.051 mol) compound 102 (colorless oil), 7 g (0.025 mol) 2,3-epoxypropyl-4-nonylphenylether and 1 g (0.009 mol) potassium-tert.-butylate are dissolved in 60 ml dry toluene. The solution is heated at 60° C. for 6 hours. After the addition of 1 ml methanol, solvents are removed in vacuo and the product dried overnight in vacuo at room temperature. The product is obtained as light brown oil.

EXAMPLE E7

In a dry, Argon-purged Schlenk tube equipped with a rubber septum, a magnetic stir bar and an Argon inlet, 17 g (0.0 mol) compound 102 (colorless oil), 28 g (0.101 mol) epoxypropyl-4-nonylphenylether and 1 g (0.009 mol) potassium-tert.-butylate are dissolved in 60 ml dry toluene. The solution is heated at 60° C. for 6 hours. After the addition of 1 ml methanol, solvents are removed in vacuo and the product dried overnight in vacuo at room temperature. The product is obtained as brown oil.

EXAMPLE E8

In a dry, Argon-purged Schlenk tube equipped with a rubber septum, a magnetic stir bar and an Argon inlet, 8.67 g (0.02 mol) compound 103 (white solid) and 0.55 g (0.0045 mol) potassium-tert.-butylate are dissolved in 30 ml dry toluene. The solution is heated at 60° C. for 6 hours. After the addition of 1 ml methanol solvents are removed in vacuo. Then the product is precipitated in methanol and dried overnight in vacuo at room temperature. The product is obtained as slight yellow solid.

EXAMPLE E9

In a dry, Argon-purged Schlenk tube equipped with a rubber septum, a magnetic stir bar and an Argon inlet, 8.67 g (0.02 mol) compound 103' (white solid), 1.78 g (0.01 mol) compound A and 0.55 g (0.0045 mol) potassium-tert.-butylate are dissolved in 40 ml dry toluene. The solution, is heated at 80° C. for 6 hours. After the addition of 1 ml methanol solvents are removed in vacuo. Then the product is precipitated in methanol and dried overnight in vacuo at room temperature. The product is obtained as slight yellow solid.

EXAMPLE E10

In a dry, Argon-purged Schlenk tube equipped with a rubber septum, a magnetic stir bar and an Argon inlet, 8.67 g (0.02 mol) compound 103 (white solid), 3.57 g (0.02 mol) compound A and 0.55 g (0.0045 mol) potassium-tert.-butylate are dissolved in 40 ml dry toluene. The solution is heated at 80° C. for 6 hours. After the addition of 1 ml methanol solvents are removed in vacuo. Then the product is precipitated in methanol and dried overnight in vacuo at room temperature. The product is obtained as slight yellow solid.

EXAMPLE E11

In a dry, Argon-purged Schlenk tube equipped with a rubber septum, a magnetic stir bar and an Argon inlet, 8.67 g (0.02 mol) compound 103 (white solid), 7.14 g (0.04 mol) compound A and 0.55 g (0.0045 mol) potassium-tert.-butylate are dissolved in 40 ml dry toluene. The solution is heated at 80° C. for 6 hours. After the addition of 1 ml methanol solvents are removed in vacuo. Then the product is precipitated in methanol and dried overnight in vacuo at room temperature. The product is obtained as slight yellow solid.

EXAMPLE E12

In a dry, Argon-purged Schlenk tube equipped with a rubber septum, a magnetic stir bar and an Argon inlet, 8.67 g (0.02 mol) compound 103 (white solid), 2.76 g (0.01 mol) 2,3-epoxypropyl-4-nonylphenylether and 0.55 g (0.0045 mol) potassium-tert.-butylate are dissolved in 50 ml dry toluene. The solution is heated at 60° C. for 6 hours. After the addition of 1 ml methanol solvents are removed in vacuo. Then the product is precipitated in methanol and dried overnight in vacuo at room temperature. The product is obtained as slight yellow solid.

EXAMPLE E13

In a dry, Argon-purged Schlenk tube equipped with a rubber septum, a magnetic stir bar and an Argon inlet, 8.67 g (0.02 mol) compound 103 (White solid), 5.52 g (0.02 mol) 2,3-epoxypropyl-4-nonylphenylether and 0.55 g (0.0045 mol) potassium-tert.-butylate are dissolved in 50 ml dry toluene. The solution is heated at 60° C. for 6 hours. After the addition of 1 ml methanol solvents are removed in vacuo. Then the product is precipitated in methanol and dried overnight in vacuo at room temperature. The product is obtained as slight yellow, high viscous oil.

EXAMPLE E14

In a dry, Argon-purged Schlenk tube equipped with a rubber septum, a magnetic stir bar and an Argon inlet, 8.67 g (0.02 mol) compound 103 (white solid), 11.06 g (0.02 mol) 2,3-epoxypropyl-4-nonylphenylether and 0.55 g (0.0045 mol) potassium-tert.-butylate are dissolved in 50 ml dry toluene. The solution is heated at 60° C. for 6 hours. After the addition of 1 ml methanol solvents are removed in vacuo. Then the product is precipitated in methanol and dried overnight in vacuo at room temperature. The product is obtained as slight yellow, high viscous oil.

Table 2 summarizes the yields and the molecular weight data of the obtained products. Polymer yield is determined gravimetrically after drying or precipitating of the products.

TABLE 2

Molecular weights and conversion data

| Example | Polymer yield (%) | $M_n$ (GPC) | $M_w$ | $M_w/M_n$ |
|---|---|---|---|---|
| E 1 | 97 | 3500 | 7500 | 2.08 |
| E 2 | 97 | 2500 | 5000 | 2.00 |
| E 3 | 98 | 4500 | 12400 | 2.70 |
| E 4 | 99 | 2900 | 7600 | 2.63 |
| E 5 | not determined | 2500 | 3700 | 1.46 |
| E 6 | n.d. | 2300 | 3000 | 1.33 |
| E 7 | n.d. | 2500 | 3300 | 1.31 |
| E 8 | 99 | 2700 | 3300 | 1.22 |
| E 9 | 99 | 3400 | 4100 | 1.21 |
| E 10 | 99 | 3500 | 4200 | 1.20 |
| E 11 | 99 | 4300 | 5200 | 1.21 |
| E 12 | 99 | 3100 | 3700 | 1.19 |
| E 13 | 99 | 2700 | 3300 | 1.22 |
| E 14 | 99 | 1800 | 2300 | 1.28 |

Preparation of Comb Copolymers by Reinitiation

EXAMPLE E15

In a dry Schlenk tube equipped with a stopcock, magnetic stirbar and an Argon inlet, 5 g of the polymer of example E5 are dissolved in 50 g (0.48 mol) of freshly distilled styrene (Merck). The solution is degassed by three consecutive freeze-thaw cycles and purged with argon. The tube is then immersed in an oil bath a heated at 130° C. for 6 hours. After cooling to room temperatures, volatiles are removed in vacuo and the crude reaction product is analyzed by GPC. The graft copolymer yield is determined gravimetrically.

EXAMPLE E16

In a dry Schlenk tube equipped with a stopcock, magnetic stirbar and an Argon inlet, 5 g of the polymer of example E6 are dissolved in 50 g (0.48 mol) of freshly distilled styrene (Merck). The solution is degassed by three consecutive freeze-thaw cycles and purged with argon. The tube is then immersed in an oil bath and heated at 130° C. for 6 hours. After cooling to room temperatures, volatiles are removed in vacuo and the crude reaction product is analyzed by GPC. The graft copolymer yield is determined gravimetrically.

EXAMPLE E17

In a dry Schlenk tube equipped with a stopcock, magnetic stirbar and an Argon inlet, 5 g of the polymer of example E7 are dissolved in 50 g (0.48 mol) of freshly distilled styrene (Merck). The solution is degassed by three consecutive freeze-thaw cycles and purged with argon. The tube is then immersed in an oil bath and heated at 130° C. for 6 hours. After cooling to room temperatures, volatiles are removed in vacuo and the crude reaction product is analyzed by GPC. The graft copolymer yield is determined gravimetrically.

EXAMPLE E18

In a dry 200 ml-autoclave (Fa. Büchi) equipped with a stirrer and an Argon inlet 2.5 g of the polymer of example E8 are dissolved in a mixture of 45 g (0.43 mol) styrene (Merck) and 15 g (0.28 mol) acrylonitrile. The solution is degassed and purged with argon. The autoclave is then immersed in an oil bath and heated at 110° C. for 6 hours. After cooling to room temperatures, volatiles are removed in vacuo and the crude reaction product is precipitated in methanol. After drying over night in vacuo at roomtemperature the graft copolymer is obtained as white solid; The graft copolymer is analyzed by GPC and the yield is determined gravimetrically.

EXAMPLE E19

In a dry 200 ml-autoclave (Fa. Büchi) equipped with a stirrer and an Argon inlet 2.5 g of the polymer of example E9 are dissolved in a mixture of 45 g (0.43 mol) styrene (Merck) and 15 g (0.28 mol) acrylonitrile. The solution is degassed and purged with argon. The autoclave is then immersed in an oil bath and heated at 110° C. for 6 hours. After cooling to room temperatures, volatiles are removed in vacuo and the crude reaction product is precipitated in methanol. After drying over night in vacuo at roomtemperature the graft copolymer is obtained as slight yellow solid. The graft copolymer is analyzed by GPC and the yield is determined gravimetrically.

EXAMPLE E20

In a dry 200 ml-autoclave (Fa. Büchi) equipped with a stirrer and an Argon inlet 2.5 g of the polymer of example E10 are dissolved in a mixture of 45 g (0.43 mol) styrene (Merck) and 15 g (0.28 mol) acrylonitrile. The solution is degassed and purged with argon. The autoclave is then immersed in an oil bath and heated at 110° C. for 6 hours. After cooling to room temperatures, volatiles are removed in vacuo and the crude reaction product is precipitated in methanol. After drying over night in vacuo at room temperature the graft copolymer is obtained as slight yellow solid. The graft copolymer is analyzed by GPC and the yield is determined gravimetrically.

EXAMPLE E21

In a dry 200 ml-autoclave (Fa. Büchi) equipped with a stirrer and an Argon inlet 2.5 g of the polymer of example E11 are dissolved in a mixture of 45 g (0.43 mol) styrene (Merck) and 15 g (0.28 mol) acrylonitrile. The solution is degassed and purged with argon. The autoclave is then immersed in an oil bath and heated at 110° C. for 6 hours. After cooling to room temperatures, volatiles are removed in vacuo and the crude reaction product is precipitated in methanol. After drying over night in vacuo at roomtemperature the graft copolymer is obtained as slight yellow solid. The graft copolymer is analyzed by GPC and the yield is determined gravimetrically.

EXAMPLE E22

In a dry 200 ml-autoclave (Fa. Büchi) equipped with a stirrer and an Argon inlet 2.5 g of the polymer of example E12 are dissolved in a mixture of 45 g (0.43 mol) styrene (Merck) and 15 g (0.28 mol) acrylonitrile. The solution is degassed and purged with argon. The autoclave is then immersed in an oil bath and heated at 110° C. for 6 hours. After cooling to room temperatures, volatiles are removed in vacuo and the crude reaction product is precipitated in methanol. After drying over night in vacuo at roomtemperature the graft copolymer is obtained as slight yellow solid. The graft copolymer is analyzed by GPC and the yield is determined gravimetrically.

EXAMPLE E23

In a dry 200 ml-autoclave (Fa. Büchi) equipped with a stirrer and an Argon inlet 2.5 g of the polymer of example E13 are dissolved in a mixture of 45 g (0.43 mol) styrene (Merck) and 15 g (0.28 mol) acrylonitrile. The solution is degassed and purged with argon. The autoclave is then immersed in an oil bath and heated at 110° C. for 6 hours. After cooling to room temperatures, volatiles are removed in vacuo and the crude reaction product is precipitated in methanol. After drying over night in vacuo at roomtemperature the graft copolymer is obtained as slight yellow solid. The graft copolymer is analyzed by GPC and the yield is determined gravimetrically.

EXAMPLE E24

In a dry 200 ml-autoclave (Fa. Büchi) equipped with a stirrer and an Argon inlet 2.5 g of the polymer of example E14 are dissolved in a mixture of 45 g (0.43 mol) styrene (Merck) and 15 g (0.28 mol) acrylonitrile. The solution is degassed and purged with argon. The autoclave is then immersed in an oil bath and heated at 110° C. for 6 hours. After cooling to room temperatures, volatiles are removed In vacuo and the crude reaction product is precipitated in methanol. After drying over night in vacuo at roomtemperature the graft copolymer is obtained as slight yellow solid. The graft copolymer is analyzed by GPC and the yield is determined gravimetrically.

Table 3 summarizes the yields and the molecular weight data of the obtained graft copolymers. Molecular weights are determined as described above.

TABLE 3

Molecular weights and styrene or styrene/acrylonitrile conversion.

| Example | % styrene or styrene/acrylonitrile grafted onto backbone | $M_n$ (GPC) | $M_w$ | $M_w/M_n$ |
|---|---|---|---|---|
| E 15 | 22 | 4600 | 6500 | 1.42 |
| E 16 | 7 | 4100 | 5600 | 1.38 |
| E 17 | 15 | 3700 | 8700 | 2.33 |
| E 18 | 55 | 42500 | 53000 | 1.25 |
| E 19 | 61 | 50500 | 63200 | 1.25 |
| E 20 | 53 | 44900 | 58800 | 1.31 |
| E 21 | 63 | 61500 | 87200 | 1.41 |
| E 22 | 47 | 43100 | 52900 | 1.23 |
| E 23 | 52 | 40000 | 54600 | 1.37 |
| E 24 | 41 | 35300 | 48300 | 1.37 |

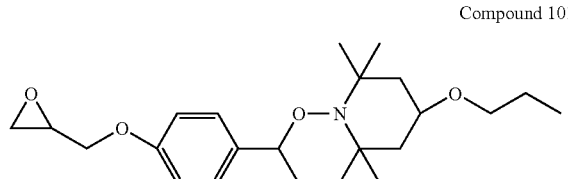

Compound 101

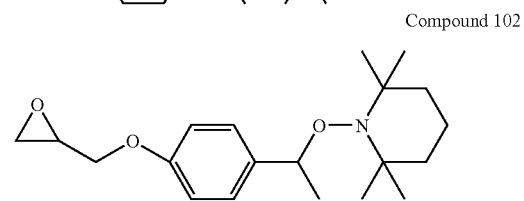

Compound 102

Both compounds are prepared according to WO 99/46261, examples A1 and A5.

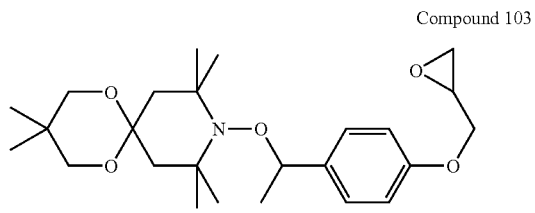

Compound 103

Compound 103 is prepared as described In WO 02/48109.

The invention claimed is:

1. A method for the preparation of a comb or star copolymer, said method comprising
   a) polymerizing in a first step, two or more epoxy group containing monomers to obtain a polyether, wherein at least one monomer is of formula (II)

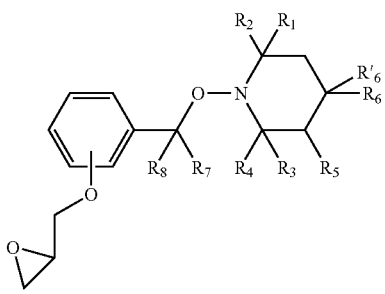

(II)

wherein $R_1$, $R_2$, $R_3$ and $R_4$ are independently of each other $C_1$-$C_4$alkyl;

$R_5$ is hydrogen or $C_1$-$C_4$alkyl;

$R'_6$ is hydrogen and $R_6$ is H, $OR_{10}$, $NR_{10}R_{11}$, —O—C(O)—$R_{10}$ or $NR_{11}$—C(O)—$R_{10}$;

$R_{10}$ and $R_{11}$ independently are hydrogen, $C_1$-$C_{18}$alkyl, $C_2$-$C_{18}$alkenyl, $C_2$-$C_{18}$alkinyl or $C_2$-$C_{18}$alkyl which is substituted by at least one hydroxy group or, if $R_6$ is $NR_{10}R_{11}$, taken together, form a $C_2$-$C_{12}$alkylene bridge or a $C_2$-$C_{12}$-alkylene bridge interrupted by at least one O atom; or $R_6$ and $R'_6$ together are both hydrogen, a group =O or =N—O—$R_{20}$ wherein $R_{20}$ is H, straight or branched $C_1$-$C_{18}$alkyl, $C_3$-$C_{18}$alkenyl or $C_3$-$C_{18}$alkinyl, which may be unsubstituted or substituted, by one or more OH, $C_1$-$C_8$alkoxy, carboxy, $C_1$-$C_8$alkoxycarbonyl;

$C_5$-$C_{12}$cycloalkyl or $C_5$-$C_{12}$cycloalkenyl;

phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;

—C(O)—$C_1$-$C_{36}$alkyl, or an acyl moiety of a α,β-unsaturated carboxylic acid having 3 to 5 carbon atoms or of an aromatic carboxylic acid having 7 to 15 carbon atoms;

—$SO_3^-Q^+$, —$PO(O^-Q^+)_2$, —$P(O)(OR_2)_2$, —$SO_2$—$R_2$, —CO—NH—$R_2$, —$CONH_2$, $COOR_2$, or $Si(Me)_3$, wherein $Q^+$ is $H^+$, ammnonium or an alkali metal cation; or $R_6$ and $R_6'$ are independently —O—$C_1$-$C_{12}$alkyl, —O—$C_3$-$C_{12}$alkenyl, —O—$C_3$-$C_{12}$alkinyl, —O—$C_5$-$C_8$cycloalkyl, —O-phenyl, —O-naphthyl, —O—$C_7$-$C_9$phenylalkyl; or $R_6$ and $R'_6$ together form one of the bivalent groups —O—C($R_{21}$)($R_{22}$)—CH($R_{23}$)—O—, —O—CH($R_{21}$)—$CH_{22}$—C($R_{22}$)($R_{23}$)—O—, —O—CH($R_{22}$)—$CH_2$—C($R_{21}$)($R_{23}$)—O—, —O—$CH_2$—C($R_{21}$)($R_{22}$)—CH($R_{23}$)—O—, —O-o-phenylene-O—, —O-1,2-cyclohexyliden-O—, —O—$CH_2$—CH=CH—$CH_2$—O— or

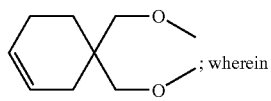
; wherein $R_{21}$ is hydrogen, $C_1$-$C_{12}$alkyl, COOH, COO—($C_1$-$C_{12}$)alkyl or $CH_2OR_{24}$;

$R_{22}$ and $R_{23}$ are independently hydrogen, methyl, ethyl, COOH or COO—($C_1$-$C_{12}$)alkyl;

$R_{24}$ is hydrogen, $C_1$-$C_{12}$alkyl, benzyl, or a monovalent acyl residue derived from an aliphatic, cycloaliphatic or aromatic monocarboxylic acid having up to 18 carbon atoms; and $R_7$ and $R_8$ are independently hydrogen or $C_1$-$C_{18}$alkyl;

and at least one monomer is an epoxy group containing monomer different from formula (II);

where the weight ratio of the monomer of formula (II) to the sum of the other monomers is from 99:1 to 1:99;

and in a second step b) adding to the polymer obtained in step a) at least one ethylenically unsaturated monomer or oligomer, heating the resulting mixture to a temperature where cleavage of the nitroxylether bond occurs and radical polymerization starts; and polymerizing to the desired degree.

2. A method according to claim 1 wherein in step b) the weight ratio between the polyether prepared in step a) and the ethylenically unsaturated monomer is from 90:10 to 10:90.

3. A method according to claim 1, wherein $R_1$, $R_2$, $R_3$, $R_4$ are methyl, or $R_1$ and $R_3$ are ethyl and $R_2$ and $R_4$ are methyl, or $R_1$ and $R_2$ are ethyl and $R_3$ and $R_4$ are methyl.

4. A method according to claim 1 wherein $R_5$ is hydrogen or methyl.

5. A method according to claim 1 wherein $R'_6$ is hydrogen and $R_6$ is H, $OR_{10}$, $NR_{10}R_{11}$, —O—C(O)—$R_{10}$ or $NR_{11}$—C(O)—$R_{10}$;

$R_{10}$ and $R_{11}$ independently are hydrogen, $C_1$-$C_{18}$alkyl, $C_2$-$C_{18}$alkenyl, $C_2$-$C_{18}$alkinyl or $C_2$-$C_{18}$alkyl which is substituted by at least one hydroxy group or, if $R_6$ is $NR_{10}R_{11}$, taken together, form a $C_2$-$C_{12}$alkylene bridge or a $C_2$-$C_{12}$-alkylene bridge interrupted by at least one O atom; or $R_6$ and $R'_6$ together are both hydrogen, a group =O or =N—O—$R_{20}$ wherein $R_{20}$ is H or straight or branched $C_1$-$C_{18}$alkyl.

6. A method according to claim 1, wherein $R_6$ and $R'_6$ together form one of the bivalent groups —O—C($R_{21}$)($R_{22}$)—CH($R_{23}$)—O—, —O—CH($R_{21}$)—$CH_{22}$—C($R_{22}$)($R_{23}$)—O—, —O—CH($R_{22}$)—$CH_2$—C($R_{21}$)($R_{23}$)—O— or —O—$CH_2$—C($R_{21}$)($R_{22}$)—CH($R_{23}$)—O—.

7. A method according to claim 1 where the epoxy group containing monomer different from formula (II) is selected from the group consisting of ethylene oxide, propylene oxide, 2,3-epoxypropyl-4-ethyl-phenylether, 2,3-epoxypropyl-phenylether, 2,3-epoxypropyl-4-nonyl-phenylether, epichlorohydrine and 2,3-epoxypropyl-2,2,3,3,4,4,5,5-octafluoropentylether.

8. A method according to claim 1 wherein in step b) the polymerization temperature is from 80° C. to 160° C.

9. A method according to claim 1 wherein in step b) the ethylenically unsaturated monomer or oligomer is selected from the group consisting of styrene, substituted styrene, conjugated dienes, vinyl acetate, vinylpyrrolidone, vinylimidazole, maleic anhydride, (alkyl)acrylic acid anhydrides, (alkyl)acrylic acid salts, (alkyl)acrylic esters, (meth)acrylonitriles, (alkyl)acrylamides, vinyl halides and vinylidene halides.

10. A method according to claim 9 wherein in step b) the ethylenically unsaturated monomers are styrene, methylacrylate, ethylacrylate, butylacrylate, isobutylacrylate, tert butylacrylate, hydroxyethylacrylate, hydroxypropylacrylate, dimethylaminoethylacrylate, methyl(meth)acrylate, ethyl(meth)acrylate, butyl(meth)acrylate, hydroxyethyl(meth)acrylate, hydroxypropyl(meth)acrylate, dimethylaminoethyl(meth)acrylate, acrylonitrile, acrylamide, methacrylamide or dimethylaminopropyl-methacrylamide.

* * * * *